United States Patent
Tsirkin et al.

(10) Patent No.: US 8,806,186 B2
(45) Date of Patent: Aug. 12, 2014

(54) USER-CONTROLLABLE BOOT ORDER THROUGH A HYPERVISOR

(75) Inventors: Michael S. Tsirkin, Yokneam Yillit (IL); Gieb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 412 days.

(21) Appl. No.: 13/223,218

(22) Filed: Aug. 31, 2011

(65) Prior Publication Data

US 2013/0054950 A1 Feb. 28, 2013

(51) Int. Cl.
*G06F 9/00* (2006.01)

(52) U.S. Cl.
USPC .................................. 713/2; 713/1; 713/100

(58) Field of Classification Search
None
See application file for complete search history.

(56) References Cited

U.S. PATENT DOCUMENTS

| | | | | |
|---|---|---|---|---|
| 2009/0276772 A1* | 11/2009 | Garrett et al. | ...... | 718/1 |
| 2011/0107331 A1* | 5/2011 | Evans et al. | ...... | 718/1 |
| 2011/0238969 A1* | 9/2011 | Warkentin et al. | ...... | 713/2 |

* cited by examiner

*Primary Examiner* — Paul Yanchus, III
(74) *Attorney, Agent, or Firm* — Lowenstein Sandler LLP

(57) ABSTRACT

A method and system for providing a user-controllable boot order via a hypervisor in a virtual machine system. A Basic Input/Output System (BIOS) receives a boot order list associated with a guest from the hypervisor. The boot order list is an ordered list that specifies an order of device names, according to which the BIOS searches for boot software when booting up the guest. In the boot order list, devices of the same device type are identified by different device names. Upon receipt of a command to boot up the guest, the BIOS searches for the boot software following the order of the device names specified by the boot order list. The BIOS then boots up the guest using the boot software located in one of the devices.

20 Claims, 4 Drawing Sheets

USER-CONTROLLABLE BOOT ORDER THROUGH A HYPERVISOR

TECHNICAL FIELD

Embodiments of the present invention relate to the management of boot processes in a virtual machine system, and more specifically, to the management of a user-controllable boot order in a virtual machine system.

BACKGROUND

The Basic Input/Output System (BIOS) is the first code run by a computer when the computer is powered on. The primary function of the BIOS is to load and start an operating system. When a computer starts up, the BIOS initializes system devices and locates those devices from which an operating system can be loaded. The BIOS then loads the operating system from the device. This process is known as booting, booting up, or bootstrapping.

The BIOS in a virtual machine system can boot up guests hosted by the system according to a default boot order. The boot order recognized by the BIOS can be a list of device types; e.g., disk, CD-ROM, network, floppy. However, a virtual machine system can have multiple devices of the same device type (e.g., multiple disks). Thus, the BIOS needs to check each individual device of the same device type in order to find a device that stores boot software (e.g., an operating system and other software used for booting) from which a guest can be booted. When different boot software is stored in multiple devices of the same device type, the BIOS may boot a guest from one device while the user intends it to boot from another device of the same device type. A system administrator cannot control the order of devices that the BIOS should follow when searching for boot software in a system that has multiple devices of the same device type.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for providing a user-controllable boot order via a hypervisor in a virtual machine system. In one embodiment, a computer system hosts a hypervisor, a management component and a guest. The hypervisor receives a boot order list of the guest from the management component. The boot order list is an ordered list that specifies the order of device names, according to which a Basic Input/Output System (BIOS) searches for boot software when booting up the guest. In the boot order list, devices of the same device type are identified by different device names. The hypervisor passes the boot order list to a BIOS. Upon receipt of a command to boot up the guest, the BIOS searches for the boot software following the order of the device names specified by the boot order list. The BIOS then boots up the guest using the boot software located in one of the devices.

Throughout the following description, the term "guest" refers to the software that runs, or can run on a hypervisor. A guest can be installed on a disk, loaded into memory, or currently running. A guest can include one or more of the following: a firmware copy in memory, an operating system, additional installed software, a browser, applications running on the browser, and other similar software. The term "virtual machine" (VM) refers to part of a hypervisor and the host computer system running the hypervisor that are visible to the guest. A virtual machine can include one or more of the following: memory, virtual central processing unit (CPU), virtual devices (e.g., emulated network interface card (NIC), disk or similar components), physical devices over which a guest is given partial or full control. The virtual machine can also emulate firmware such as BIOS, Extensible Firmware Interface (EFI), Advanced Configuration and Power Interface (ACPI), and similar firmware.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
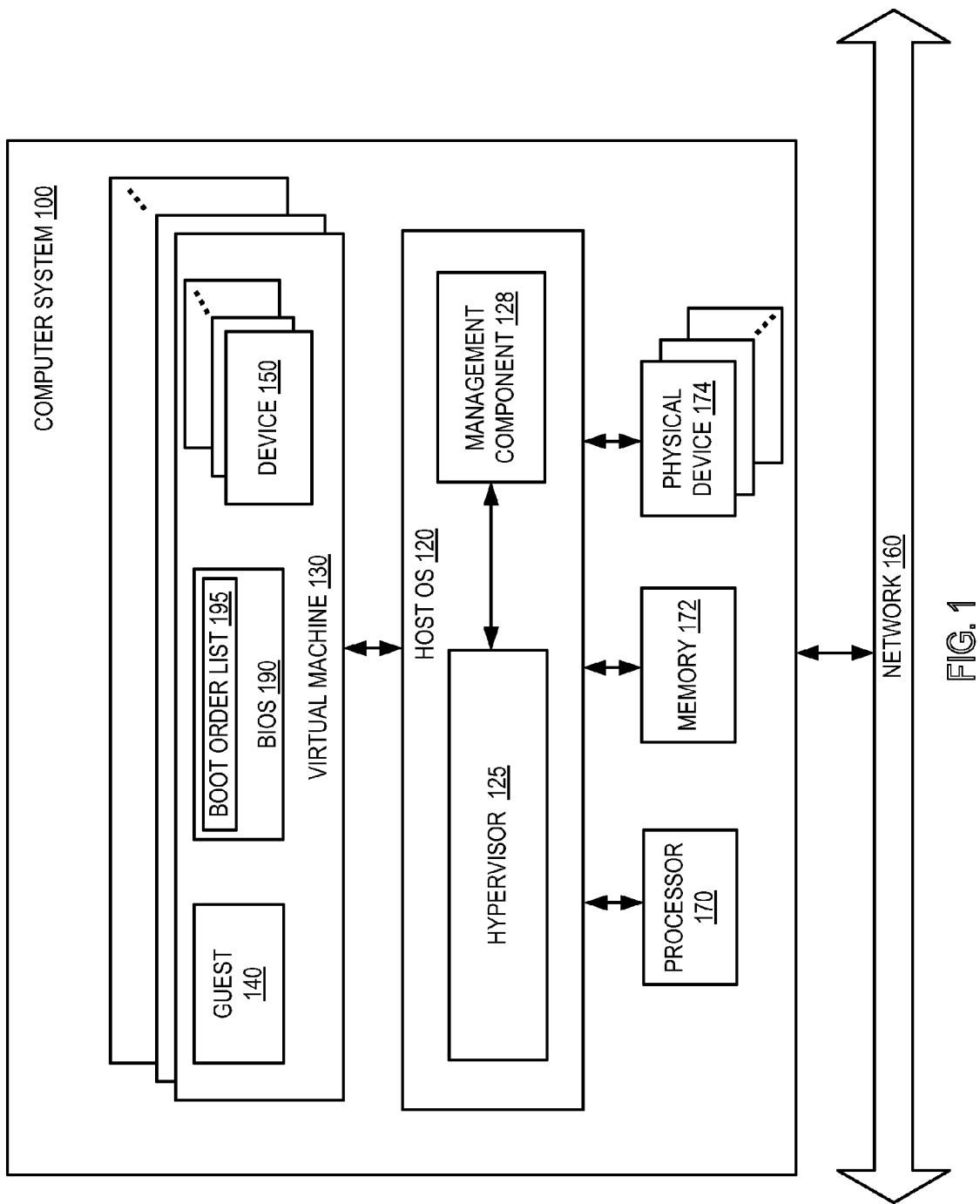
FIG. 1 is a block diagram illustrating one embodiment of a virtual machine system.

FIG. 1 is a block diagram that illustrates an embodiment of a computer system 100. The computer system 100 includes a processor 170, a memory 172 (e.g., RAM, ROM, hard disk, etc.), and physical devices 174 (e.g., network card, CDROM drive, sound card, etc.). The computer system 100 hosts a plurality of virtual machines 130. Each of the virtual machines 130 may include a guest 140. The guest 140 may comprise an operating system, such as Microsoft Windows®, Linux®, Solaris®, Mac® OS, and other similar operating systems. The computer system 100 can be a server computer or a number of server computers (e.g., a distributed system).

In one embodiment, the computer system 100 runs a hypervisor 125 to virtualize access to the underlying host hardware (e.g., one or more processors 170, memory 172, physical devices 174, and other hardware components) for the guest 140 and/or the virtual machine 130, as well as the user and the client of the guest 140 and/or the virtual machine 130. For simplicity of the illustration, not all of the components of the computer system 100 are shown in FIG. 1. The hypervisor 125 is also known as a virtual machine monitor (VMM), a kernel-based hypervisor, or a host operating system 120. The hypervisor 125 presents to the guest 140 emulated hardware and software components (e.g., in the form of virtual machine 130), such that the specifics of the host (i.e., the computer system 100) is hidden from the guest 140, its user and its client. Operations of the hypervisor 125 are executed by the one or more processors 170 of the computer system 100. Although one processor and one memory are shown in FIG. 1, it is understood that the computer system 100 can include any number of processors and/or memories (e.g., RAM and a hard disk).

In one embodiment, the computer system 100, the guests 140, and/or the virtual machines 130 may be accessible by remote systems via a network 160. The network 160 may be a private network (e.g., a local area network (LAN), a wide area network (WAN), intranet, or other similar private networks) or a public network (e.g., the Internet).

In one embodiment, the virtual machine 130 also includes a BIOS 190 storing code to start a boot process, including searching for a device that contains boot software at boot time. In one embodiment, the BIOS 190 is stored in an emulated non-volatile memory, such as an emulated flash memory device. The virtual machine 130 includes one or more devices 150 that store boot software (e.g., an operating system and other software used for booting). The devices 150 may comprise emulated devices (e.g., virtual devices). Examples of the devices 150 include networked devices, disks, CD-ROMs, floppy disks, and other similar components. In one embodiment, the virtual machine 130 includes multiple devices of the same device type; for example, multiple disks, multiple CD-ROMs, multiple floppy disks, multiple networked devices and so on. To start up a guest (e.g., the guest 140), the BIOS 190 looks up a boot order list 195 associated with the guest 140 and boots up the guest 140 in the order specified by the boot order list 195. In one embodiment, this boot order list 195 is an ordered list of device names, each device name uniquely identifying one of the devices 150. The boot order list 195 specifies the order of device names, according to which the BIOS 190 searches for boot software when it boots up the guest. In one embodiment, this boot order list 195 can be provided by a user (e.g., a system administrator).

In one embodiment, the boot order list 195 for the guest 140 is managed by a management component 128. The management component 128 can be located on the same server computer of the computer system 100 as the hypervisor 125, or on a different server computer coupled to the hypervisor 125. In one embodiment, the management component 128 can be part of the host OS 120 or part of the hypervisor 125. In another embodiment, the management component 128 can be a management application that runs on the computer system 100 but is not part of the hypervisor 125 or the host OS 120. In one embodiment, the management component 128 can receive the boot order list 195 for each guest from a user interface (e.g., a graphical user interface that allows a user to select or enter device names in the order from which the guest 140 is to be booted up). In another embodiment, the management component 128 can receive the boot order list 195 by reading a file that is modifiable by a user. The management component 128 passes the boot order list 195 to the BIOS 190 via the hypervisor 125. The boot order list 195 can replace the default boot order used by the BIOS 190.

Figure 2:
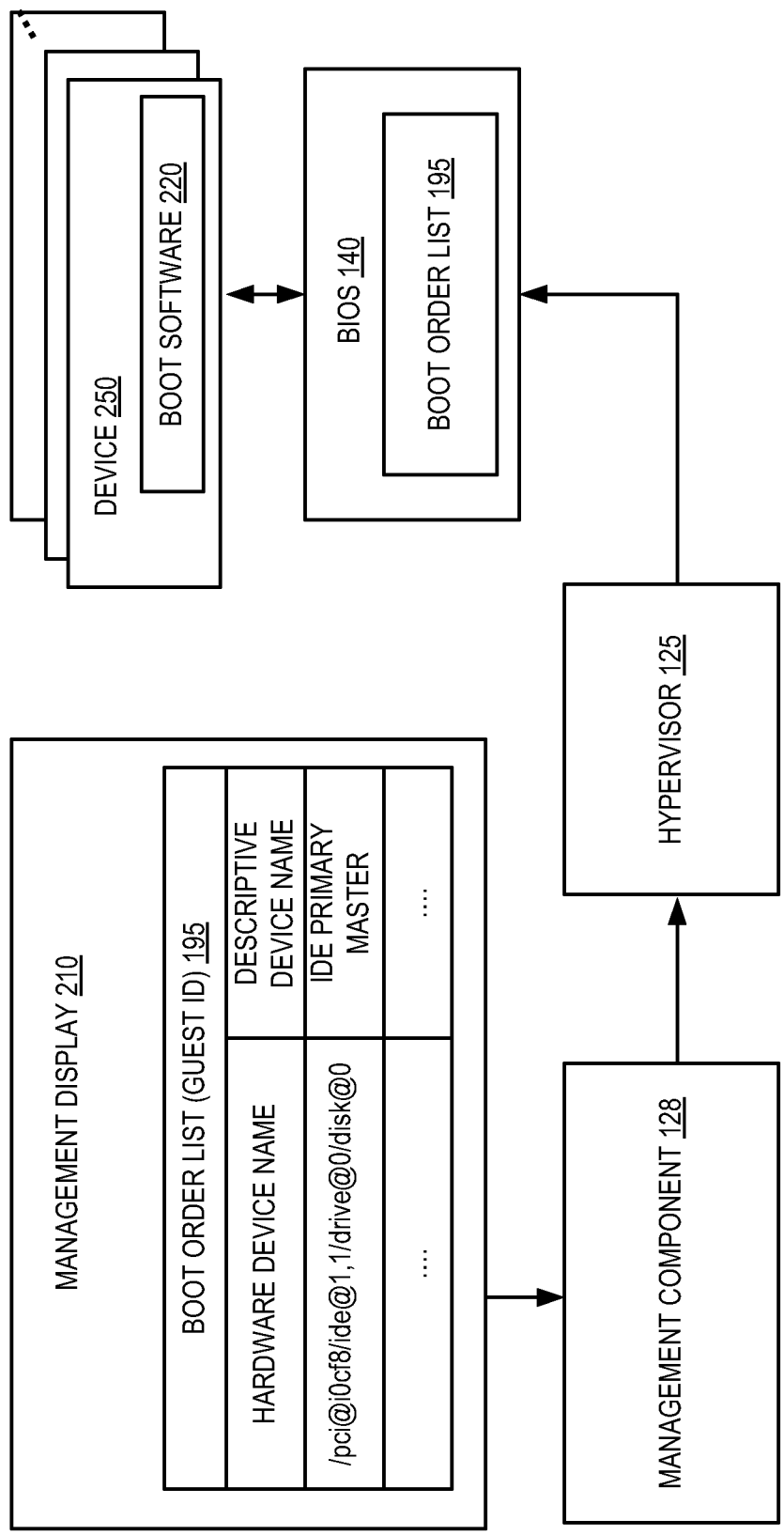
FIG. 2 is a block diagram of one embodiment of a computer system that manages a boot order list of a guest.

FIG. 2 is a block diagram that illustrates an embodiment in which the boot order list 195 is generated and passed to the BIOS 190. In one embodiment, the management component 128 receives the boot order list 195 from a user (e.g., a system administrator) via a user interface, a file, or other means. This can occur when the user wants to start a new guest, or when the user wants to change the boot order of an existing guest for rebooting that guest. The boot order list 195 can be specified by a user via a user interface such as a graphical user interface (GUI) or a browser window on a management display 210 coupled to the management component 128. Using the management display 210, the user can view, create and modify the boot order list 195 associated with each guest. In one embodiment, the boot order list 195 includes a list of device names (e.g., hardware identifiers or hardware addresses), each uniquely identifying one of the devices 150 in the virtual machine 130. The management component 128 passes the entire boot order list, or an update portion of an existing boot order list, to the hypervisor 125, with an indication of the guest 140 with which the boot order list 195 is associated. In one embodiment, the management component 128 sends a pointer to the hypervisor 125 that points to a memory location where the boot order list 195 (or the update thereof) is stored. The hypervisor 125 retrieves the boot order list 195 and, in turn, passes the boot order list 195 to the BIOS 190 via an existing channel between the hypervisor 125 and the BIOS 190. After the BIOS 190 receives the boot order list 195, it stores the boot order list 195. When the BIOS 190 receives a request to boot up the guest 140, it searches for boot software 220 in the devices 150 following the order specified in the boot order list 195.

In one embodiment, the channel 145 between the BIOS 190 and the hypervisor 125 is implemented by a shared storage location (e.g., a shared memory location or registers). The hypervisor 125 can place the boot order list 195 or an update to the boot order list 195 in the shared storage location upon receiving the boot order list 195 or the update from the management component 128. In one embodiment, the channel is writable by the hypervisor 125 and readable by the BIOS 190.

An example of the device names is provided below in Table 1. It is noted that only the hardware device names in the first column need to be passed to the BIOS 190. In one embodiment, the device names are standard hardware addresses (as shown in Table 1). The BIOS 190 is able to locate the devices 150 in the virtual machine 130 using these device names.

TABLE 1

| Hardware Device Name (as passed to the BIOS) | Description Device Name |
| --- | --- |
| /pci@i0cf8/ide@1,1/drive@1/disk@0 | IDE secondary master |
| /pci@i0cf8/isa@1/fdc@03f1/floppy@1 | Floppy B |
| /pci@i0cf8/isa@1/fdc@03f1/floppy@0 | Floppy A |
| /pci@i0cf8/ide@1,1/drive@1/disk@1 | IDE secondary slave |
| /pci@i0cf8/ide@1,1/drive@0/disk@0 | IDE primary master |
| /pci@i0cf8/scsi@3/disk@0,0 | virtio disk |
| /pci@i0cf8/ethernet@4/ethernet-phy@0 | Etherent A |
| /pci@i0cf8/ethernet@5/ethernet-phy@0 | Etherent B |
| /pci@i0cf8/ide@1,1/drive@0/disk@1 | IDE primary slave |

Figure 3:
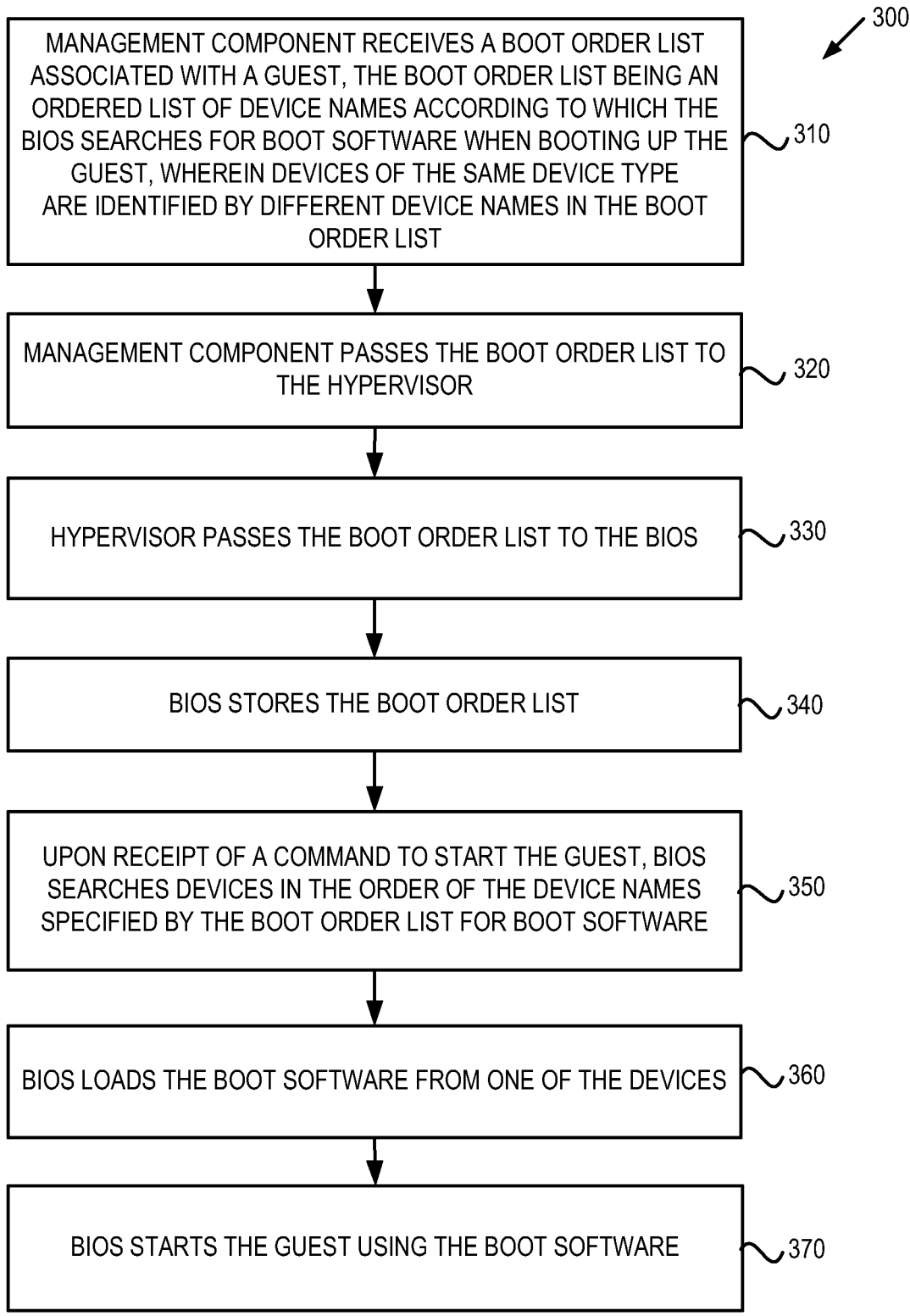
FIG. 3 is a flow diagram of one embodiment of a method of managing a boot order list of a guest.

FIG. 3 is a flow diagram illustrating one embodiment of a method 300 for managing a boot order list of a guest. The method 300 may be performed by a computer system 400 of FIG. 4 that may comprise hardware (e.g., circuitry, dedicated logic, programmable logic, microcode, or other similar hardware), software (e.g., instructions run on a processing device), or a combination thereof. In one embodiment, the method 300 is performed by the management component 128, the hypervisor 125 and the BIOS 190 of FIGS. 1 and 2.

Referring to FIG. 3, in one embodiment, the method 300 begins when the management component 128 receives the boot order list 195 associated with the guest 140 or an update to the boot order list 195 (block 310). In one embodiment, the boot order list 195 is an ordered list of device names according to which the BIOS 190 searches for boot software when booting up the guest 140. In the boot order list 195, devices of the same device type are identified by different device names. In one embodiment, the boot order list 195 is received from a user interface (e.g., the management display 210 of FIG. 2). Alternatively, the management component 128 reads the boot order list 195 from a file in response to a command. The management component 128 passes the boot order list 195 to the hypervisor 125 (block 320), which passes the boot order list 195 to the BIOS 190 (block 330). The BIOS 190 then stores the boot order list 195 (block 340). In one embodiment, the BIOS 190 stores a separate boot order list for each of the guests that have been booted or are to be booted on the virtual machine 130.

In one embodiment, upon receipt of a command to start (or re-start) the guest 140, the BIOS 190 searches the devices 150 in the order specified by the boot order list (of the guest 140) for the boot software 220 (block 350). When the BIOS 190 identifies such a device, the BIOS 190 loads the boot software 220 from the identified device (block 360). The BIOS 190 then starts the guest using the boot software 220 (block 370).

In one embodiment, before or after the guest 140 is booted up on the virtual machine 130, the boot order list 195 associated with the guest 140 can be updated by a user; e.g., by adding a device name to the list 195, deleting a device name from the list 195, or reordering the device names in the list 195. The update to the boot order list 195 can be entered by a user via a user interface. After the update is sent to the BIOS 190 via the management component 128 and the hypervisor 125, the guest 140 can be booted (or rebooted) according to the updated boot order list 195.

Figure 4:
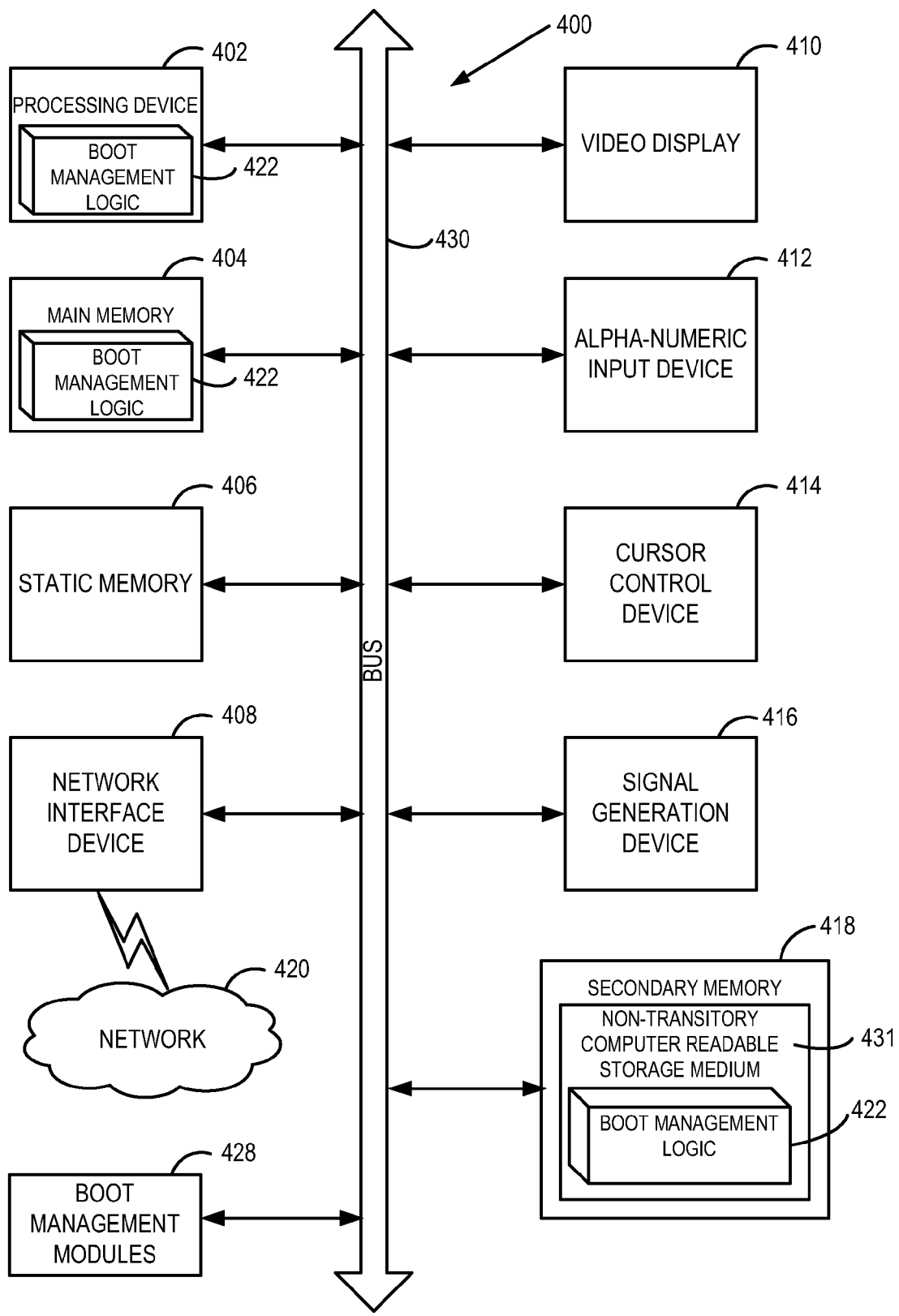
FIG. 4 illustrates a diagrammatic representation of a machine in the exemplary form of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), Rambus DRAM (RDRAM), or other variations of memory), a static memory 406 (e.g., flash memory, static random access memory (SRAM), or other variations of static memory), and a secondary memory 418 (e.g., a data storage device), which communicate with each other via a bus 430.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute boot management logic 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a non-transitory computer readable storage medium) 431 on which is stored one or more sets of instructions (e.g., the boot management logic 422) embodying any one or more of the methodologies or functions described herein (e.g., the management component 128 and/or the hypervisor 125 of FIGS. 1 and 2). The boot management logic 422 may also reside, completely or at least partially, within the main memory 404 and/or within the processing device 402 during execution thereof by the computer system 400; the main memory 404 and the processing device 402 also constituting machine-readable storage media. The boot management logic 422 may further be transmitted or received over a network 420 via the network interface device 408.

The non-transitory computer readable storage medium 431 may also be used to store the boot management logic 422 persistently. While the non-transitory computer storage medium 431 is shown in an exemplary embodiment to be a single medium, the term "non-transitory computer storage medium" should be taken to include a single medium or multiple media (e.g., a centralized or distributed database, and/or associated caches and servers) that store the one or more sets of instructions. The term "non-transitory computer storage medium" shall also be taken to include any medium that is capable of storing or encoding a set of instructions for execution by the machine that causes the machine to perform any one or more of the methodologies of the present invention. The term "non-transitory computer storage medium" shall accordingly be taken to include, but not be limited to, solid-state memories, and optical and magnetic media.

The computer system 400 may additionally include boot management modules 428 for implementing the functionalities of the management component 128 and/or the hypervisor 125 of FIGS. 1 and 2. The module 428, components and other features described herein (for example in relation to FIGS. 1 and 2) can be implemented as discrete hardware components or integrated in the functionality of hardware components such as ASICS, FPGAs, DSPs or similar devices. In addition, the module 428 can be implemented as firmware or functional circuitry within hardware devices. Further, the module 428 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "passing," "searching," "booting," "reading," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a non-transitory computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   receiving, by a Basic Input/Output System (BIOS), a boot order list associated with a guest from a hypervisor hosted by a processing device, the boot order list being an ordered list that specifies an order of device names, according to which the BIOS searches for boot software when booting up the guest, wherein devices of a same device type are identified by different device names in the boot order list;
   searching, by the BIOS, the devices in the order of the device names specified by the boot order list for the boot software upon receipt of a command to boot up the guest; and
   booting up the guest using the boot software located in one of the devices.

2. The method of claim 1, wherein receiving the boot order list further comprises:
   receiving the boot order list from a user via a user interface presented on a management display.

3. The method of claim 1, wherein receiving the boot order list further comprises:
   reading the boot order list from a file modifiable by a user.

4. The method of claim 1, wherein the device names comprise hardware addresses of the devices.

5. The method of claim 1, wherein the BIOS stores a separate boot order list for each of a plurality of guests that have been booted or are to be booted on the processing device.

6. The method of claim 1, further comprising:
   sending an update to the boot order list from a user to the BIOS via the management component and the hypervisor; and
   booting up the guest according to the updated boot order list.

7. The method of claim 1, wherein the devices belong to one or more of the device types: CD-ROMs, disks, networked devices, and floppy disks.

8. A system comprising:
   a non-volatile memory that stores a Basic Input/Output System (BIOS); and
   a processor, coupled to the non-volatile memory executing a hypervisor, a guest and a management component, to:
      receive a boot order list of the guest from the management component, wherein the boot order list comprises an ordered list that specifies an order of device names, according to which the BIOS searches for boot software when booting up the guest, wherein devices of the same device type are identified by different device names in the boot order list,
      pass the boot order list to the BIOS via the hypervisor,
      search the devices in the order of the device names specified by the boot order list for the boot software upon receipt of a command to boot up the guest, and
      boot up the guest with the boot software located in one of the devices.

9. The system of claim 8, further comprising:
   a management display coupled to the processor, the management display adapted to present a user interface, from which the boot order list is received from a user.

10. The system of claim 8, wherein the boot order list is modifiable by a user.

11. The system of claim 8, wherein the device names comprise hardware addresses of the devices.

12. The system of claim 8, wherein the BIOS stores a separate boot order list for each of a plurality of guests that have been booted or are to be booted on the processing device.

13. The system of claim 8, wherein the devices belong to one or more of the device types: CD-ROMs, disks, networked devices, and floppy disks.

14. A non-transitory computer readable storage medium that stores instructions thereon, which, when executed by a processing device, cause the processing device to perform operations comprising:
   receiving, by a Basic Input/Output System (BIOS), a boot order list of a guest from a hypervisor hosted by the processing device, the boot order list being an ordered list that specifies an order of device names, according to which the BIOS searches for boot software when booting up the guest, wherein devices of a same device type are identified by different device names in the boot order list;
   searching, by the BIOS, the devices in the order of the device names specified by the boot order list for the boot software upon receipt of a command to boot up the guest; and
   booting up the guest using the boot software located in one of the devices.

15. The non-transitory computer readable storage medium of claim 14, wherein receiving the boot order list further comprises:

receiving the boot order list from a user via a user interface presented on a management display.

16. The non-transitory computer readable storage medium of claim 14, wherein receiving the boot order list further comprises:
   reading the boot order list from a file modifiable by a user.

17. The non-transitory computer readable storage medium of claim 14, wherein the device names comprise hardware addresses of the devices.

18. The non-transitory computer readable storage medium of claim 14, wherein the BIOS stores a separate boot order list for each of a plurality of guests that have been booted or are to be booted on the processing device.

19. The non-transitory computer readable storage medium of claim 14, wherein the operations further comprise:
   sending an update to the boot order list from a user to the BIOS via the management component and the hypervisor; and
   booting up the guest according to the updated boot order list.

20. The non-transitory computer readable storage medium of claim 14, wherein the devices belong to one or more of the device types: CD-ROMs, disks, networked devices, and floppy disks.

* * * * *